(12) United States Patent
Yun et al.

(10) Patent No.: US 12,036,739 B2
(45) Date of Patent: Jul. 16, 2024

(54) CLEANING APPARATUS FOR 3D PRINTING STRUCTURE AND CLEANING METHOD FOR 3D PRINTING STRUCTURE USING THE SAME

(71) Applicant: Korea Institute of Machinery & Materials, Daejeon (KR)

(72) Inventors: Hui Suk Yun, Changwon-si (KR); Honghyun Park, Changwon-si (KR)

(73) Assignee: Korea Institute of Materials Science, Gyeongsangnam-Do (KR)

( * ) Notice: Subject to any disclaimer, the term of this patent is extended or adjusted under 35 U.S.C. 154(b) by 252 days.

(21) Appl. No.: 16/627,525

(22) PCT Filed: Jul. 18, 2019

(86) PCT No.: PCT/KR2019/008891
§ 371 (c)(1),
(2) Date: Dec. 30, 2019

(87) PCT Pub. No.: WO2020/138617
PCT Pub. Date: Jul. 2, 2020

(65) Prior Publication Data
US 2021/0101342 A1    Apr. 8, 2021

(30) Foreign Application Priority Data
Dec. 27, 2018  (KR) .................. 10-2018-0170384

(51) Int. Cl.
*B29C 64/35*     (2017.01)
*B08B 1/30*      (2024.01)
(Continued)

(52) U.S. Cl.
CPC ............... *B29C 64/35* (2017.08); *B08B 1/30* (2024.01); *B08B 3/02* (2013.01); *B33Y 40/00* (2014.12)

(58) Field of Classification Search
CPC .......... B08B 1/006; B08B 1/008; B08B 3/02; B08B 3/08; B29C 64/35; B33Y 40/00; B33Y 40/20
See application file for complete search history.

(56) References Cited

U.S. PATENT DOCUMENTS

| | | | |
|---|---|---|---|
| 2012/0195994 A1* | 8/2012 | El-Siblani | B33Y 40/20 15/320 |
| 2018/0043615 A1 | 2/2018 | Hochsmann et al. | |
| 2019/0126535 A1* | 5/2019 | Thompson | B29C 64/188 |

FOREIGN PATENT DOCUMENTS

| | | | | |
|---|---|---|---|---|
| CN | 107716363 A | * | 2/2018 | ............. B08B 1/006 |
| JP | H05318606 A | | 12/1993 | |

(Continued)

OTHER PUBLICATIONS

KR20110124080A—Machine Translation (Year: 2011).*
(Continued)

*Primary Examiner* — Yunju Kim
(74) *Attorney, Agent, or Firm* — Harness, Dickey & Pierce, P.L.C.

(57) ABSTRACT

The present invention is intended to provide a cleaning apparatus for a 3-dimensional (3D) printing structure and a cleaning method for a 3D printing structure. To this end, the present invention provides a cleaning apparatus for a 3D printing structure, the cleaning apparatus including a hygroscopic paper supply part supplying a hygroscopic paper while the wound film-type hygroscopic paper is unwound, a hygroscopic paper collecting part winding and collecting the film-type hygroscopic paper, a film-type hygroscopic paper moving in a direction from the supply part to the collecting part between the supply part and the collecting part according to a mutual operation of the supply part and the collecting part, and a support part disposed on an opposite surface of a hygroscopic paper surface, on which the 3D printing (Continued)

structure is disposed, with respect to the film-type hygroscopic paper, and a cleaning method for a 3D printing structure, and a cleaning method for a 3D printing structure. According to the present invention, the 3D printing apparatus may be cleaned by using a minimum amount of solvent, and the mixture between materials may be prevented to remarkably improve the quality and integrity of the 3D printing structure.

13 Claims, 13 Drawing Sheets

(51) Int. Cl.
*B08B 3/02* (2006.01)
*B33Y 40/00* (2020.01)

(56) References Cited

FOREIGN PATENT DOCUMENTS

| | | |
|---|---|---|
| JP | 3288274 B2 | 6/2002 |
| KR | 10-2011-0124080 A | 11/2011 |
| KR | 10-2017-0010290 A | 1/2017 |
| KR | 10-2018-0010293 A | 1/2018 |
| KR | 10-2018-0092786 A | 8/2018 |

OTHER PUBLICATIONS

CN107716363A—Machine Translation (Year: 2018).*
Lind, et al. "Instrumented cardiac microphysiological devices via multimaterial three-dimensional printing", Nature Materials, 2016, 4782.
Wicker, et al. "Multi-materials, multi-technology stereolithography, Virtual and physical prototyping", 2012, 7, 181.

* cited by examiner

[FIG. 1]
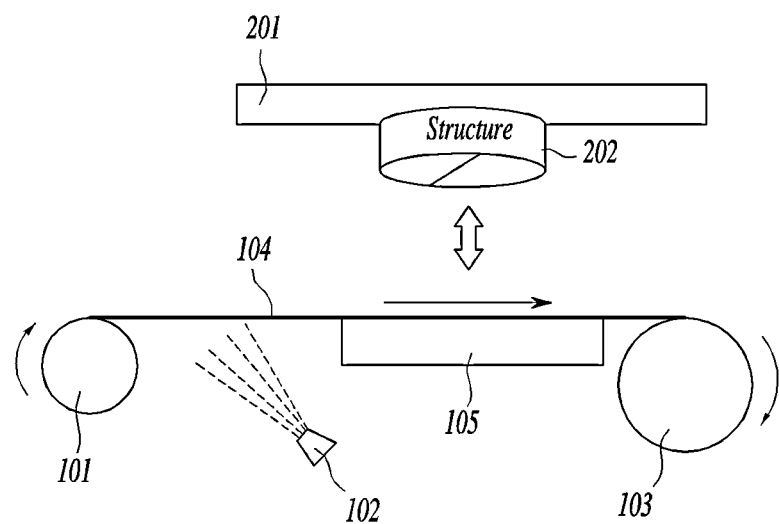
[FIG. 2]
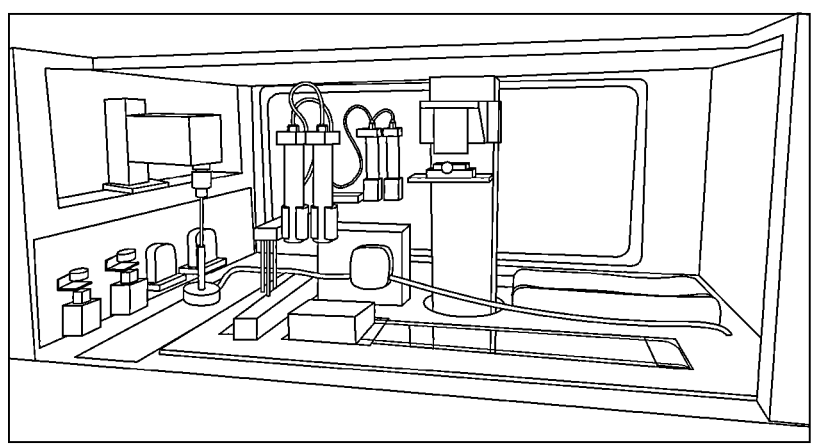

[FIG. 3]
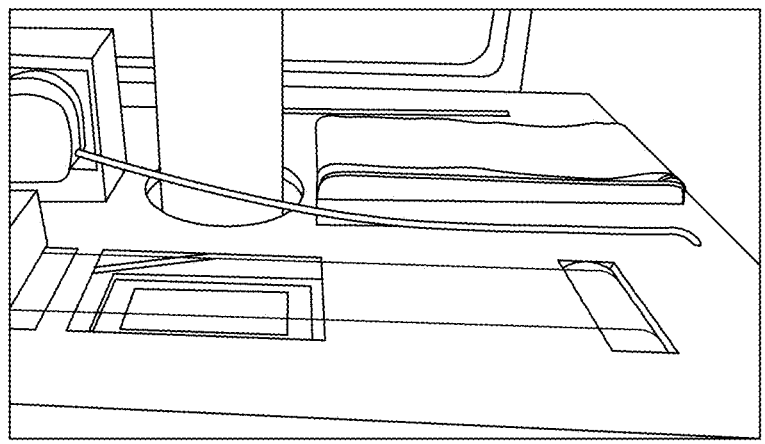
[FIG. 4]

[FIG. 5]
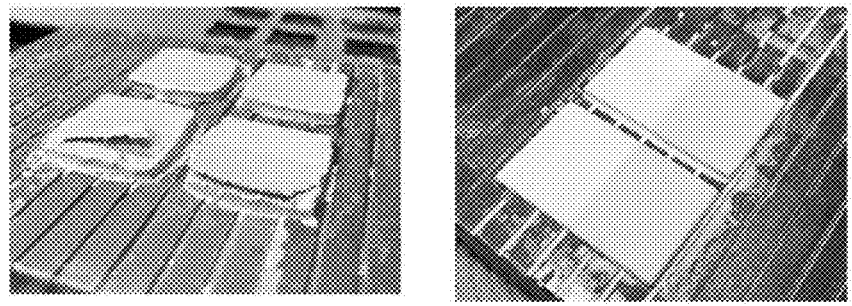
[FIG. 6]
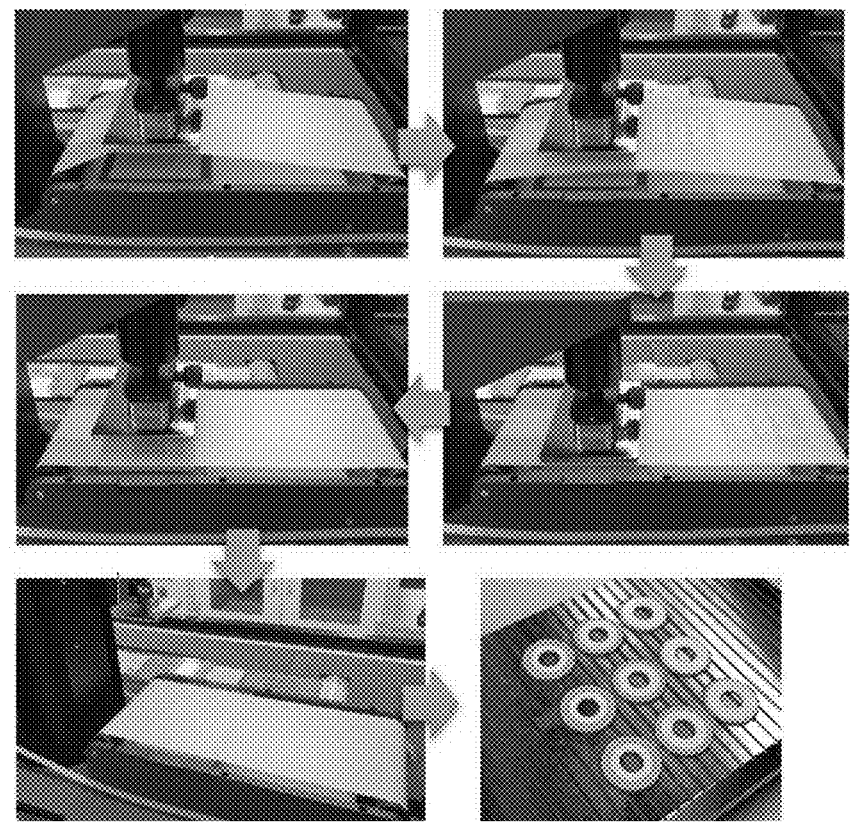

[FIG. 7]
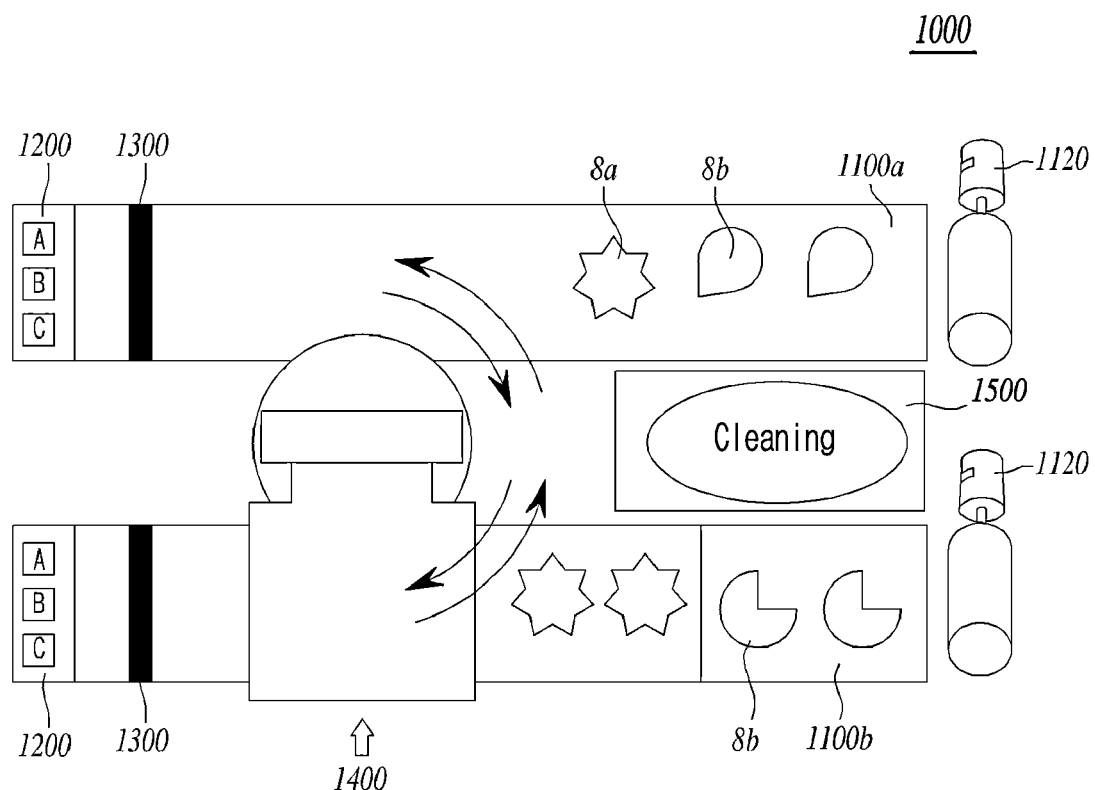

[FIG. 8]
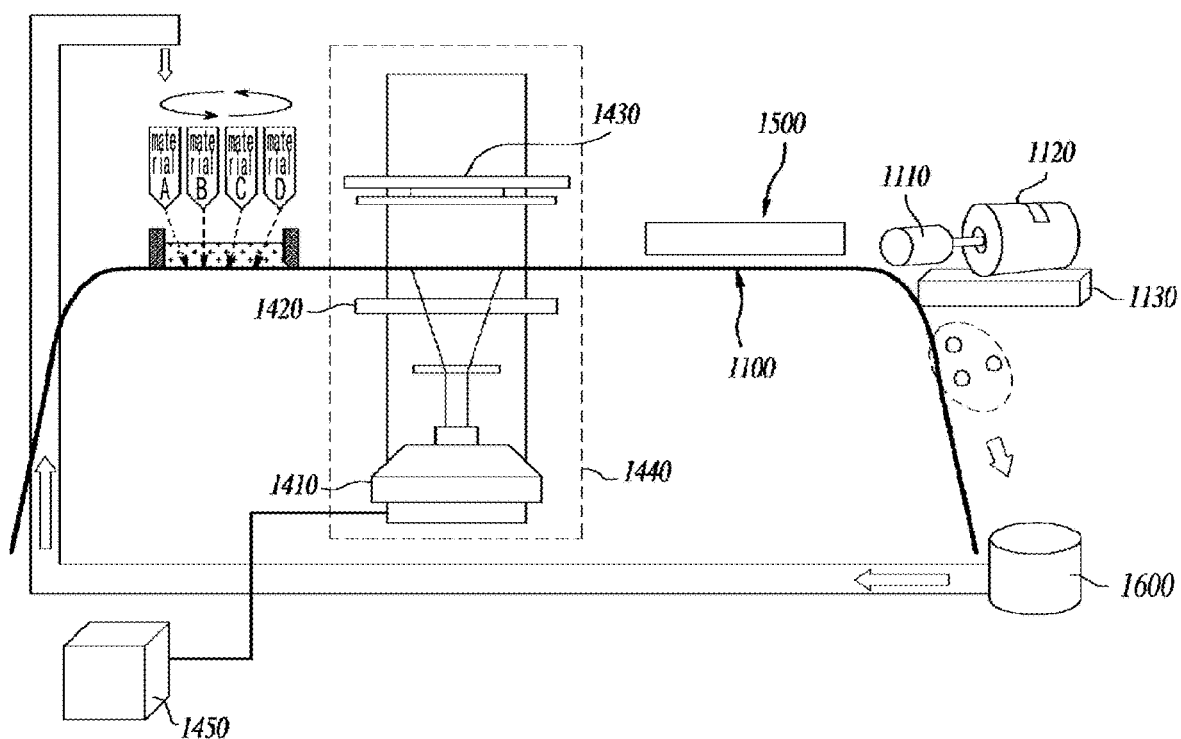

[FIG. 9]
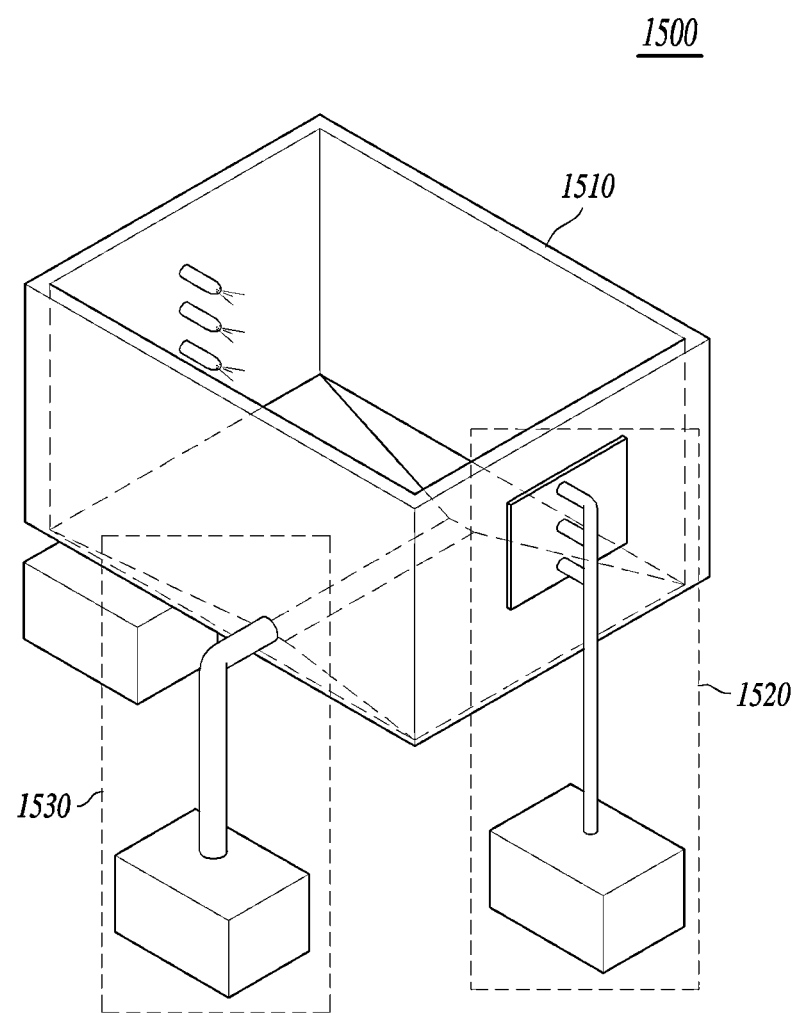

[FIG. 10]
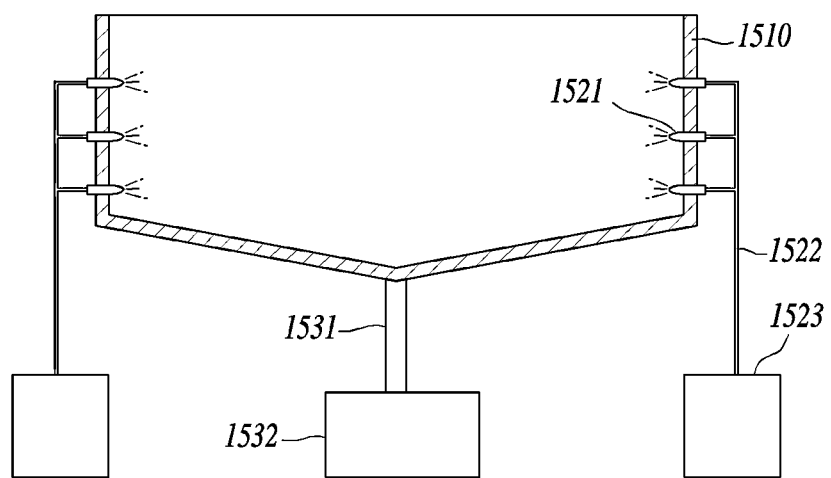
[FIG. 11]
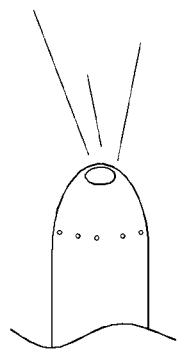

[FIG. 12]
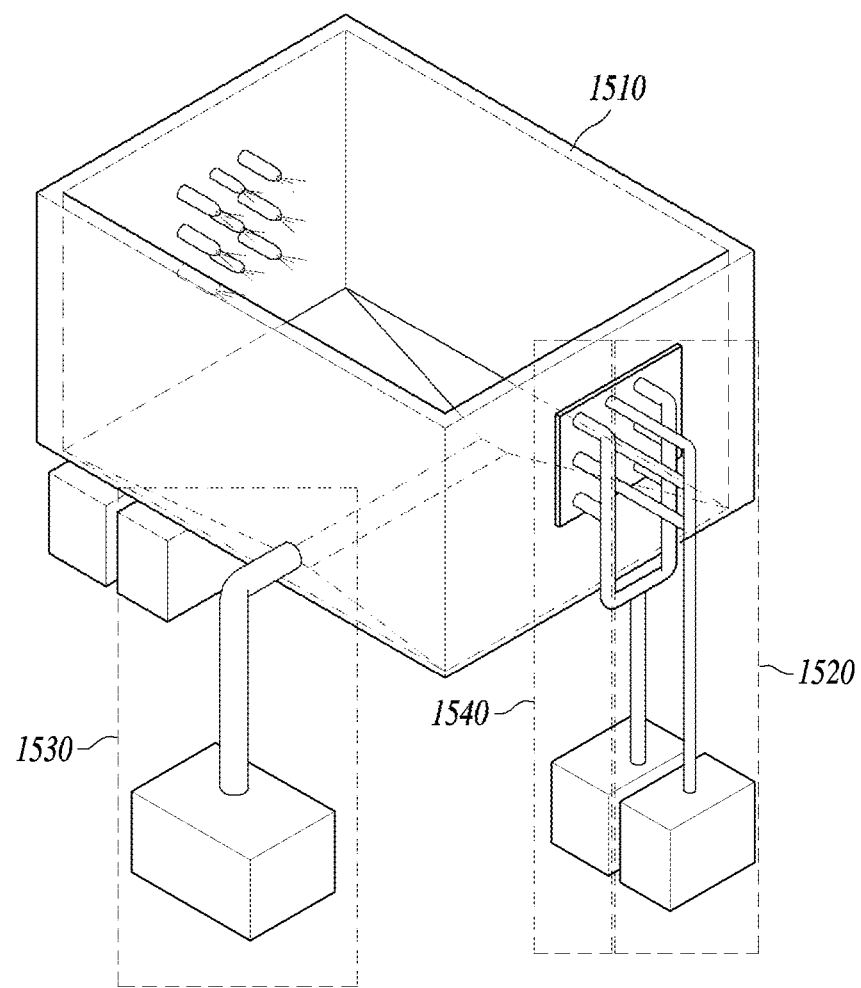

[FIG. 13]
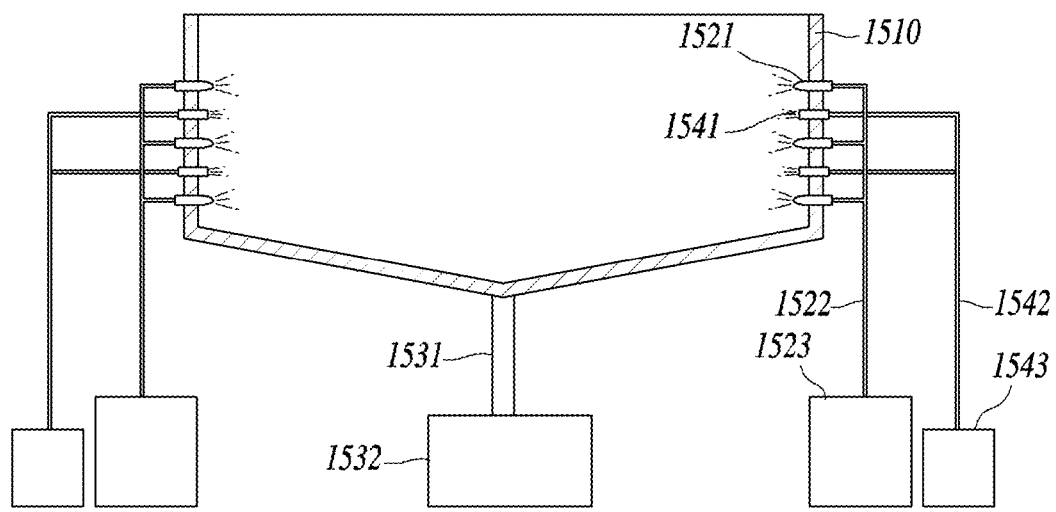

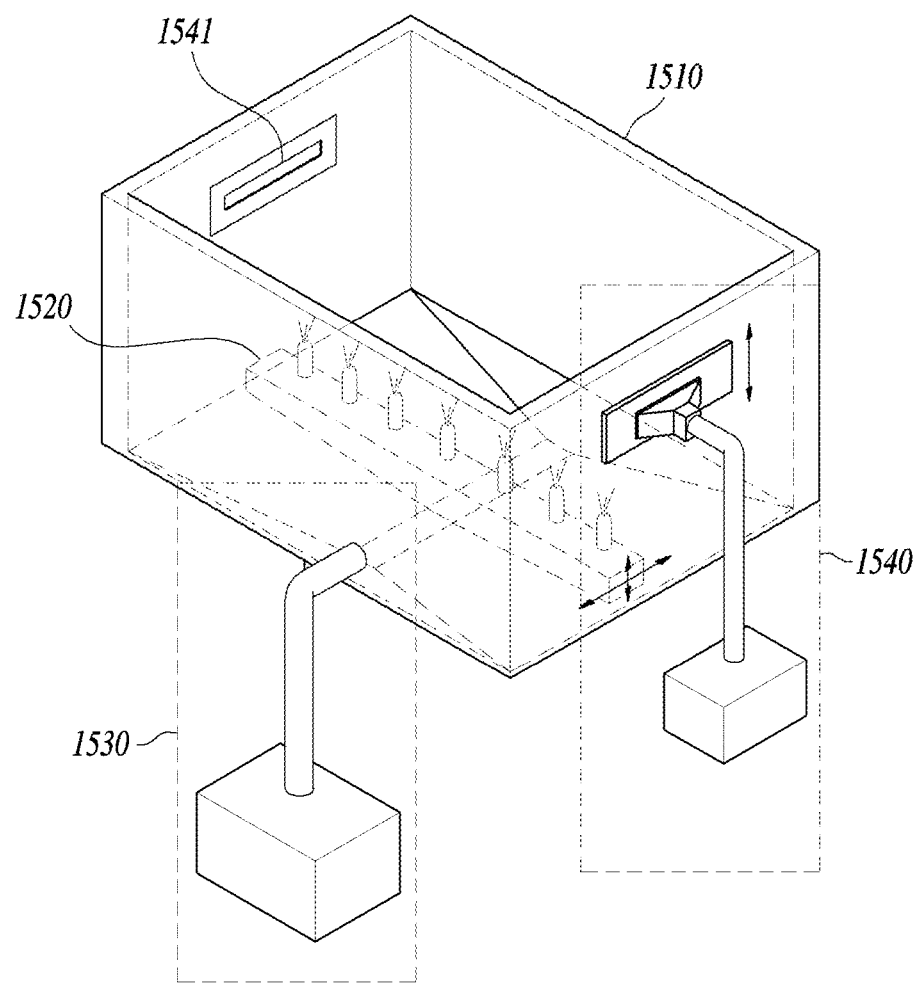
[FIG. 14]

[FIG. 15]
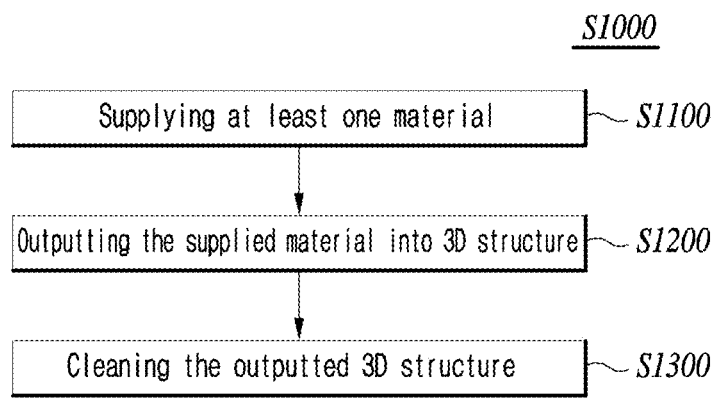
[FIG. 16]
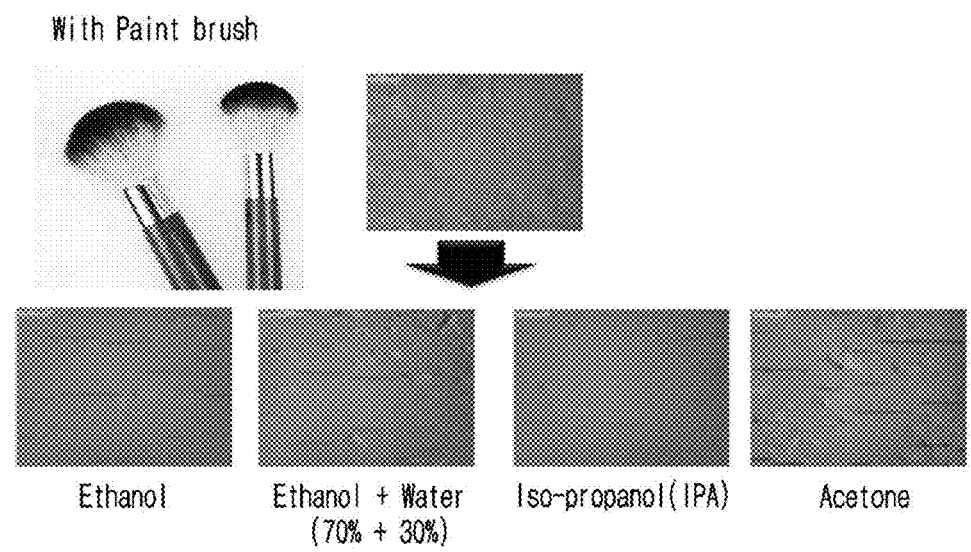

[FIG. 17]
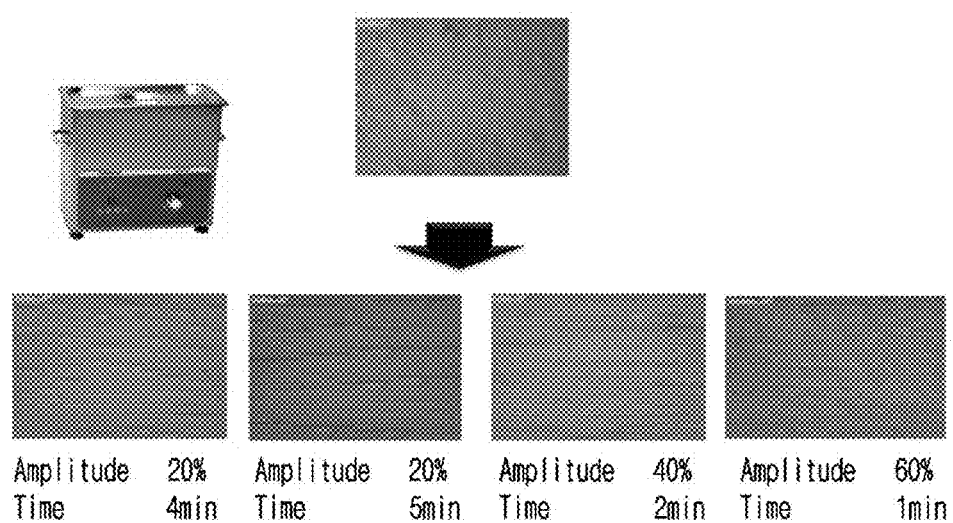
| Amplitude | 20% | Amplitude | 20% | Amplitude | 40% | Amplitude | 60% |
| Time | 4min | Time | 5min | Time | 2min | Time | 1min |
[FIG. 18]
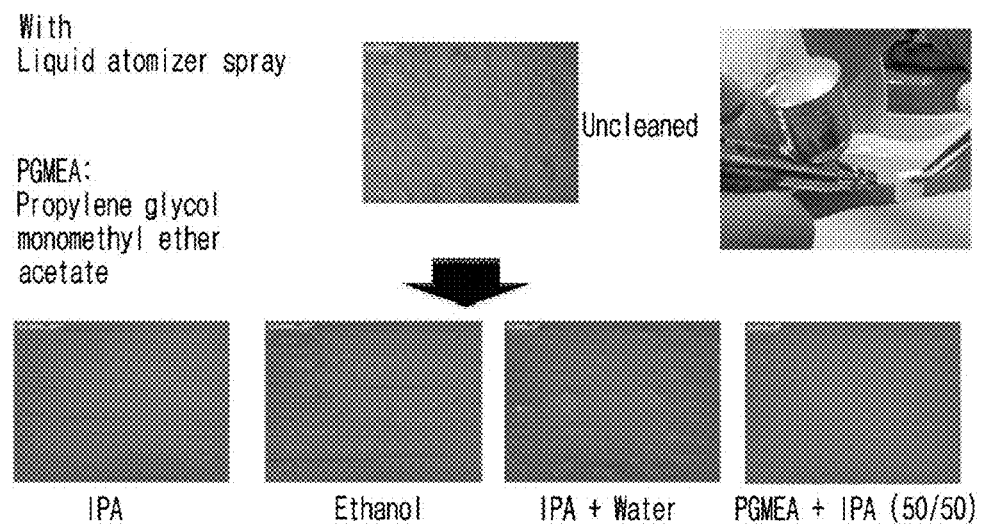
With Liquid atomizer spray
PGMEA: Propylene glycol monomethyl ether acetate
Uncleaned
IPA    Ethanol    IPA + Water    PGMEA + IPA (50/50)

[FIG. 19]
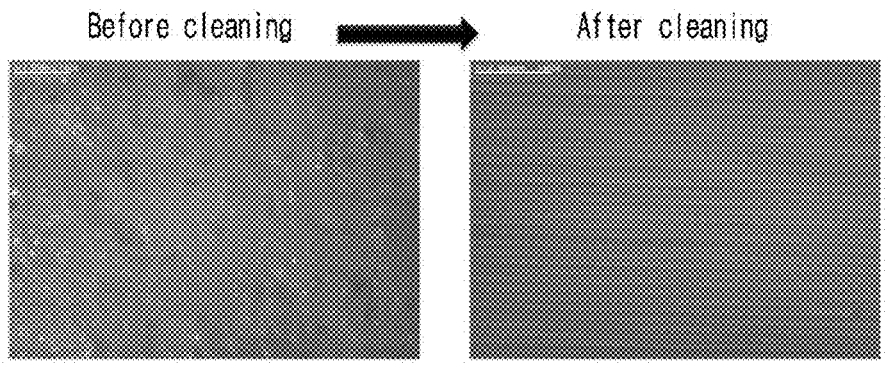
[FIG. 20]
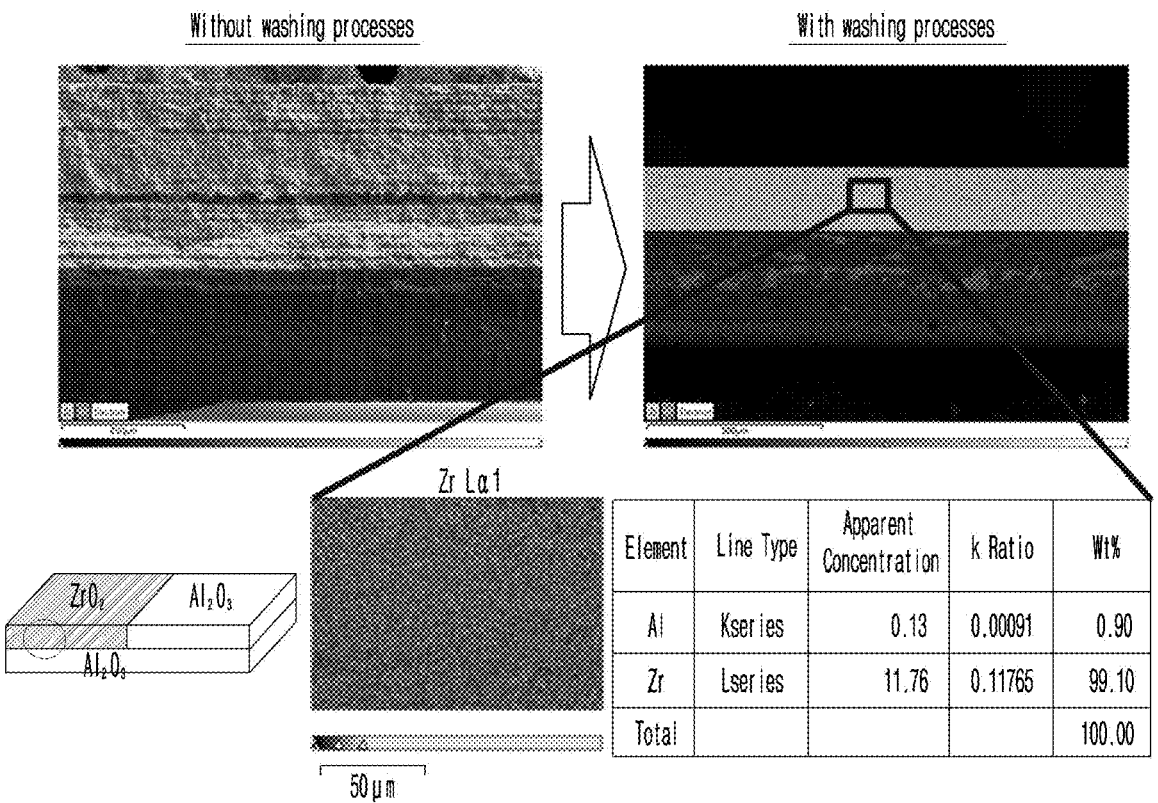

CLEANING APPARATUS FOR 3D PRINTING STRUCTURE AND CLEANING METHOD FOR 3D PRINTING STRUCTURE USING THE SAME

CROSS-REFERENCE TO RELATED APPLICATIONS

This application is a national phase under 35 U.S.C. § 371 of PCT International Application No. PCT/KR2019/008891 which has an International filing date of Sep. 18, 2019, which claims priority to Korean Application No. 10-2018-0170384, filed Dec. 12, 2018, the entire contents of each of which are hereby incorporated by reference.

BACKGROUND

The present invention herein relates to a cleaning apparatus for a 3D printing structure and a cleaning method for a 3D printing structure using the same. Also, the present invention relates to a 3D printing apparatus including a cleaning apparatus and a 3D printing method.

A 3-dimensional (3D) printing technology is a method for realizing a 3D shape in such a manner that a required 3D shape is designed through scanning or computer modeling, the shape is 2-dimensional (2D) differentiated and 2D printed by using a 3D printer with various materials such as polymer, metal, ceramic, and composite, which are necessary for realizing a material property of a final product, and then the printed 2D structures are laminated. Thus, since various 3D shapes, which are hardly realized in a typical process, may be easily realized, and the 3D shape of the final product may be easily controlled through a modification of the computer modeling instead of using a frame such as a typical casting, the 3D printing technology has an advantage in that a time and costs may be remarkably reduced in realizing the 3D shaped structure in comparison with the typical process. The 3D printing technology is originally intended to control the 3D shape. In addition, it is suggested to create a new function of realizing a structure using two or more kinds of materials and compositions. Although the polyjet technology using a material spray method performing 3D lamination by directly spraying materials is provided as a representative example, the polyjet technology may use only a polymer material. For another example, although a material extrusion method capable of using relatively various kinds of materials is being applied, there is a limitation in controlling of a precise structure (Instrumented cardiac microphysiological devices via multimaterial three-dimensional printing, Nature Materials, 2016, 4782). It is recommended that the photopolymerization 3D printing technology is applied to a more precise and compact structure. On the other hand, in case of a method of directly spraying powder, paste, and solution, e.g., a material spraying method or a material extrusion method, the mixture between materials generated during 3D printing may be prevented. However, the photopolymerization 3D printing technology, which forms a 3D shape by supplying materials in a tank at once and then moves a stage on which the materials are laminated, requires a cleaning process because the mixture between materials is extremely important when using various kinds or two kinds of materials are used. Currently, a method of cleaning a structure by repeatedly immersing the structure into a solvent stored in a separately prepared tank, or a method of cleaning a structure by using an ultrasonic wave and then removing a solution by using a dryer, when a 3D lamination stage moves between tanks in which different materials are stored, is being used (multi-materials, multi-technology stereolithography, Virtual and physical prototyping, 2012, 7, 181). However, the mixture between materials may not be completely prevented. Also, when the structure is immersed into a solution, a limitation may be generated in integrity of the structure due to the solution to cause an interlayer separation or a defect. This limitation is more seriously generated when a photo-curable material containing inorganic particles such as ceramic is used.

For example, although a technology of cleaning an object to be cleaned by spraying a cleaning solution to an endless belt-type cleaning sheet is disclosed in the apparatus for cleaning a plastic plate of Japanese Registered Patent No. 3288274 B2, this technology performs cleaning through friction, and thus the integrity of the object to be cleaned may be damaged.

Also, although a feature of cleaning a surface by inputting a cleaning solution to a film-type cleaning wiper is disclosed in Korean Publication Patent No. 10-2011-0124080 A, this technology also performs cleaning through friction, and thus the integrity of the object to be cleaned may be damaged However, the mixture between materials has two great limitations including a first limitation in which once used material is hardly recycled and a second limitation in which a material property is hardly controlled when materials having different characteristics, e.g., conductor/nonconductor, are used. When these limitations are not prevented, the 3D printing using various kinds of materials becomes meaningless.

Thus, the inventors of the present invention complete the invention by researching a cleaning apparatus capable of removing an uncured material from a structure and a cleaning method using the same, in order to prevent a plurality of materials from being mixed with each other during a process of forming the 3D printing structure with different materials.

RELATED ART DOCUMENTS (Patent document 1) Japanese Registered Patent No. 3288274 B2
(Patent document 2) Korean Publication Patent No. 10-2011-0124080 A

SUMMARY

The present disclosure provides a cleaning apparatus for a 3D printing structure and a cleaning method for a 3D printing structure.

An embodiment of the present invention provides a cleaning apparatus for a 3-dimensional (3D) printing structure, the cleaning apparatus including: a hygroscopic paper supply part configured to supply a hygroscopic paper while the wound film-type hygroscopic paper is unwound; a hygroscopic paper collecting part configured to wind and collect the film-type hygroscopic paper; a film-type hygroscopic paper configured to move in a direction from the supply part to the collecting part between the supply part and the collecting part according to a mutual operation of the supply part and the collecting part; and a support part disposed on an opposite surface of a hygroscopic paper surface, on which the 3D printing structure is disposed, with respect to the film-type hygroscopic paper, and a cleaning method for a 3D printing structure, the cleaning method including: supplying a hygroscopic paper; disposing the supplied hygroscopic paper on a support part; allowing the 3D printing structure to mutually contact the hygroscopic paper disposed on the support part; separating the 3D printing structure from the hygroscopic paper; and collecting the hygroscopic paper.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1 is a schematic view illustrating a cleaning apparatus according to an embodiment of the present invention;

FIG. 2 is a photograph showing a 3D printer in which the cleaning apparatus according to an embodiment of the present invention is installed;

FIG. 3 is an enlarged photograph showing the cleaning apparatus of FIG. 2;

FIG. 4 is a photograph verifying that a 3D printing structure is cleaned by using a method of the present invention;

FIG. 5 is a photograph showing a state of the 3D printing structure cleaned according to a typical cleaning method and a cleaning method of the present invention;

FIG. 6 is a photograph showing a cleaning process according to an embodiment of the present invention and the 3D printing structure of two kinds of materials, which is manufactured by the same;

FIG. 7 is a bird's eye view illustrating an upper portion of a 3D printing apparatus according to an embodiment of the present invention;

FIG. 8 is a side view illustrating the 3D printing apparatus according to an embodiment of the present invention;

FIG. 9 is a perspective view illustrating the cleaning apparatus of the 3D printing apparatus according to an embodiment of the present invention;

FIG. 10 is a side view illustrating the cleaning apparatus of the 3D printing apparatus according to an embodiment of the present invention;

FIG. 11 is an enlarge view illustrating a cleaning nozzle of a cleaning fluid supply part;

FIG. 12 is a perspective view illustrating another cleaning apparatus of the 3D printing apparatus according to an embodiment of the present invention;

FIG. 13 is a side view illustrating the another cleaning apparatus of the 3D printing apparatus according to an embodiment of the present invention;

FIG. 14 is a perspective view illustrating another cleaning apparatus of the 3D printing apparatus according to an embodiment of the present invention;

FIG. 15 is a flowchart representing a 3D printing method according to an embodiment of the present invention;

FIG. 16 is a view representing a cleaning effect according to a cleaning condition and a cleaning solvent of a 3D structure;

FIG. 17 is a view representing a cleaning effect according to an ultrasonic cleaning condition and a cleaning solvent of the 3D structure;

FIG. 18 is a view representing a cleaning effect according to a spray cleaning condition and a cleaning solvent of the 3D structure;

FIG. 19 is a view representing a cleaning effect before and after cleaning of the 3D structure by using the cleaning apparatus; and FIG. 20 is a view representing a mapping for element analysis and EDX results, which are obtained by comparing a feature of performing cleaning and a feature of not performing the cleaning by using the method of the present invention.

DETAILED DESCRIPTION

The present disclosure provides a cleaning apparatus for a 3-dimensional (3D) printing structure.

In the present invention, a 'film type' represents a shape having a short width and a long length when a movement direction is defined as a 'length', a perpendicular direction of the movement direction is defined as a 'width' with respect to the movement direction of an object.

The present invention provides a cleaning apparatus for a 3D printing structure, the cleaning apparatus including: a hygroscopic paper supply part supplying a hygroscopic paper while the wound film-type hygroscopic paper is unwound; a hygroscopic paper collecting part winding and collecting the film-type hygroscopic paper, a film-type hygroscopic paper moving in a direction from the supply part to the collecting part between the supply part and the collecting part according to a mutual operation of the supply part and the collecting part, and a support part disposed on an opposite surface of a hygroscopic paper surface, on which the 3D printing structure is disposed, with respect to the film-type hygroscopic paper Hereinafter, each of components of the cleaning apparatus of the present invention will be described in detail.

The cleaning apparatus for the 3D printing structure of the present invention includes a hygroscopic paper supply part supplying a hygroscopic paper while the wound film-type hygroscopic paper is unwound. In the present invention, the hygroscopic paper performing a function of cleaning the 3D printing structure has a film shape. For example, in a state in which the hygroscopic paper is wound in a roll shape, the hygroscopic paper is supplied while being unwound from the roll shape.

Also, the present invention includes a hygroscopic paper collecting part that collects the film-type hygroscopic paper while winding the hygroscopic paper. The hygroscopic paper, which is supplied while being unwound from the hygroscopic paper supply part, is collected while being wound in, e.g., a roll shape again.

Thereafter, the cleaning apparatus for a 3D printing structure of the present invention include the film-type hygroscopic paper moving in a direction from the supply part to the collecting part between the supply part and the collecting part according to a mutual operation of the supply part and the collecting part. The hygroscopic paper performs a function of cleaning the 3D printing structure, and moves in the direction from the supply part to the collecting part as the supply part and the collecting part mutually operate for a continuous cleaning process.

Here, although the hygroscopic paper contained in the cleaning apparatus of the present invention may not generate dusts, may not include impurities, may sustain a movement tension, and may be made of a material such as pure cotton having a low surface unevenness, the embodiment of the present invention is not limited thereto. For example, the hygroscopic paper having a function capable of cleaning the 3D printing structure may be used.

The cleaning apparatus for the 3D printing structure of the present invention includes a support part disposed on an opposite surface of a hygroscopic paper surface, on which the 3D printing structure is disposed, with respect to the film-type hygroscopic paper. The cleaning apparatus of the present invention is required to include the support part disposed on the opposite surface of the hygroscopic paper contacting the 3D printing structure, to support a pressure applied when the 3D printing structure contacts the hygroscopic paper, because the 3D printing structure is cleaned through the process in which the 3D printing structure contacts the hygroscopic paper. Here, although the support part may be made of various materials, it is preferred to use a material having cushioning characteristics capable of absorbing the pressure with elasticity in order to remove a residual material without affecting integrity of the structure.

The cleaning apparatus for the 3D printing structure of the present invention may further include a solvent supply part disposed between the supply part and the support part to supply a solvent to the hygroscopic paper, which is supplied from the hygroscopic paper supply part, when necessary. The solvent is sprayed with an appropriate amount on the hygroscopic paper to prevent from being directly sprayed to the structure, and then used to completely remove the primarily removed residual material. That is, the cleaning apparatus for the 3D printing structure of the present invention cleans the 3D printing structure in such a manner that a residual material is primarily removed by a repeated stamping of the hygroscopic paper, and then the hygroscopic paper, to which the solvent is supplied, contacts the 3D printing structure, as necessary, e.g., when the residual material is not completely removed by the repeated stamping. Thus, the cleaning apparatus of the present invention may supply the solvent to the hygroscopic paper as necessary before the hygroscopic paper contacts the 3D printing structure by including the solvent supply part between the hygroscopic paper supply part and the support part. The solvent supply part may include a component for performing a function capable of controlling a spray direction, method, and amount of the solvent.

Here, the solvent used in the solvent supply part of the present invention may be one kind selected from the group consisting of isopropanol and ethanol, or a mixed solvent thereof. Although the solvents are preferred to be used as a cleaning solution because the solvents give little influence on the integrity of the laminated structure made of two kinds of materials or various kinds of materials by being quickly dried after removing the residual material, the embodiment of the present invention is not limited thereto.

When the hygroscopic paper contacts the 3D printing structure, the support part preferably has an area equal to or greater than that of the 3D printing structure, which is in contact with the support part with the hygroscopic paper therebetween, in order to support the applied pressure and simultaneously allow the hygroscopic paper to contact an entire surface to be cleaned of the 3D printing structure. When the support part has an area less than that of the 3D printing structure contacting the support part, the surface to be cleaned of the 3D printing structure may not fully contact the hygroscopic paper, and thus cleaning may not be thoroughly performed.

In the cleaning apparatus for the 3D printing structure of the present invention, the hygroscopic paper may clean the structure in a method of removing a material of an uncured portion of the 3D printing structure that is being printed. The hygroscopic paper or the hygroscopic paper, to which the solvent is supplied, of the present invention may prevent a printing quality of the structure from being deteriorated, as, e.g., a plurality of materials are mixed with each other in a process of forming the structure with a different plurality of materials, by removing the material of the uncured portion of the structure.

The cleaning apparatus for the 3D printing structure of the present invention may be contained in various printing apparatuses to clean the 3D printing structure that is being printed. Particularly, the cleaning apparatus may be disposed between one supply part and another supply part of a printing apparatus including a plurality of material supply parts to perform a cleaning in an intermediate process of moving the structure that is being printed from one supply part to another supply part.

The cleaning apparatus for the 3D printing structure of the present invention may resolve a limitation of using a lot of unnecessary solvents for cleaning the structure that is being printed, prevent a printing quality from being deteriorated as a plurality of materials are mixed with each other when the plurality of materials are printed, and further prevent the integrity of the structure from being deteriorated because brushing or ultrasonic treatment is not performed on the structure in the cleaning process.

The present invention also provides a cleaning method for a 3D printing structure, the cleaning method including: supplying a hygroscopic paper; disposing the supplied hygroscopic paper on a support part; allowing the 3D printing structure to mutually contact the hygroscopic paper disposed on the support part; separating the 3D printing structure from the hygroscopic paper; and collecting the hygroscopic paper.

Hereinafter, each of process of the cleaning method of the present invention will be described in detail.

The cleaning method of the present invention includes a process of supplying a hygroscopic paper. In the present invention, the hygroscopic paper performs a function of contacting a 3D printing structure to clean the structure and also performs a function of accommodating a solvent for cleaning the 3D printing structure when additional cleaning is necessary as stated below.

The cleaning method of the present invention includes a process of disposing the hygroscopic paper, which is supplied as described above, on a support part. The supply part performs a function of supporting the hygroscopic paper by absorbing a pressure applied to the hygroscopic paper in a process in which the hygroscopic paper contacts the 3D printing structure in the following processes. Here, although the support part may be manufactured by using any material capable of absorbing the pressure, it is preferred to use, e.g., a material having cushioning characteristics capable of absorbing the pressure with elasticity.

Thereafter, the cleaning method of the present invention includes a process of allowing the 3D printing structure to contact the hygroscopic paper disposed on the support part. Here, the 3D printing structure may be a structure that is being printed in various kinds of 3D printing apparatuses, e.g., a structure printed by being laminated in a top-down manner. The cleaning method of the present invention allows the above-described structure to contact the hygroscopic paper, thereby cleaning the structure. More particularly, through the above-described mutual contact, the cleaning may be performed in a method of removing a material of an uncured portion of the 3D printing structure.

Here, in the process of allowing the 3D printing structure to contact the hygroscopic paper disposed on the support part of the cleaning method of the present invention, it is preferred to stop the supplying and collecting of the hygroscopic paper. That is, it is preferred that the 3D printing structure contacts the hygroscopic paper in a state in which the hygroscopic paper is fixed on the support part. When the hygroscopic paper contacts the 3D printing structure while moving, integrity of the structure is deteriorated because, e.g., the structure is partially damaged.

After the cleaning is performed as described above, the cleaning method for the 3D printing structure of the present invention includes a process of separating the 3D printing structure from the hygroscopic paper. As the structure is separated from the hygroscopic paper, the used hygroscopic paper is ready to be collected.

The cleaning method of the present invention includes a process of collecting the hygroscopic paper after the 3D printing structure is separated from the hygroscopic paper. Although the supplying and collecting of the hygroscopic paper may be performed in various methods, the hygroscopic paper may be supplied and collected in such a manner that the hygroscopic paper is unwound from the supply part and wound around the collecting part because, e.g., the supply part around which the hygroscopic paper is wound in a roll type and the collecting part mutually operate as in the case used in the cleaning apparatus of the present invention.

In the cleaning method of the present invention, processes from the process of supplying the hygroscopic paper to the process of collecting the hygroscopic paper may be repeatedly performed, e.g., the processes may be repeated five times. This repetition is for completely cleaning the 3D printing structure that is being printed. Since the complete cleaning gives a great influence on a quality of the finally completed 3D printing structure, it is preferred to repeat the cleaning until the cleaning is completely performed.

The cleaning method of the present invention may include a process of applying a solvent to the hygroscopic paper, which is supplied as described above, and this process may be performed at least one time. Although the hygroscopic paper itself performs a function of cleaning the 3D printing structure, when complete cleaning is difficult through this, the cleaning may be preformed by further including the process of applying the solvent to the hygroscopic paper. The hygroscopic paper accommodates the solvent through the above-described process and then contacts the 3D printing structure, so that the hygroscopic paper and the solvent cleans the structure. Here, the solvent used in the cleaning method of the present invention may be one kind selected from the group consisting of isopropanol and ethanol or a mixed solvent thereof. Although the solvents are preferred to be used as a cleaning solution because the solvents give little influence on the integrity of the laminated structure made of two kinds of materials or various kinds of materials by being quickly dried after removing the residual material, the embodiment of the present invention is not limited thereto.

According to the cleaning method for the 3D printing structure of the present invention, there are effects of resolving a limitation of unnecessarily using a lot of solvents for cleaning the structure that is being printed, preventing the printing quality from being deteriorated as a plurality of materials are mixed with each other when the printing is performed by using the plurality of materials, and further preventing the integrity of the structure from being deteriorated because the brushing or the ultrasonic treatment is not performed on the structure during the cleaning process.

Hereinafter, the present invention will be described in detail with reference to FIG. 1. However, the below description and FIG. 1 are merely intended to further clearly described the present invention, but the scope of the claims of the present invention is not limited by the description and FIG. 1. Particularly, although a solvent supply part 102 is merely illustrated as a specific example, the scope of the claims of the present invention is not limited to the solvent supply part.

At one side of a cleaning apparatus 100 of the present invention, a wound hygroscopic paper 104 is disposed, and a hygroscopic paper supply part 101 supplying the hygroscopic paper while unwinding the wound hygroscopic paper is disposed. At the other side thereof, a hygroscopic paper collecting part 103 collecting the hygroscopic paper while wounding the hygroscopic paper again is disposed. Also, the solvent supply part 102 for supplying the solvent to the hygroscopic paper 104 is disposed, and a support part 105 for supporting the hygroscopic paper, to which the solvent is supplied, is disposed. Here, since the solvent is required to be supplied to the hygroscopic paper 104 before the hygroscopic paper 104 is disposed on the support part 105, the solvent supply part 102 is necessarily disposed between the hygroscopic paper supply part 101 and the support part 105. As the hygroscopic paper supply part 101 and the hygroscopic paper collecting part 103 rotate at the same rotation speed and in the same rotation direction, the hygroscopic paper 104 moves in a direction from the supply part to the collecting part. The hygroscopic paper 104, to which the solvent is supplied by the solvent supply part 102, is disposed on the support part 105, and, in this state, the 3D printing structure 202 fixed to a stage 201 descends to mutually contact the hygroscopic paper 104 on the support part 105. In this state, the 3D printing structure 202 is cleaned. As the stage 202 ascends after the cleaning, the 3D printing structure 202 is separated from the hygroscopic paper 104, and, thereafter, the supply part 101 and the collecting part 103 rotate at the same speed and in the same direction to collect the hygroscopic paper that is previously used for the cleaning. Here, the mutual contact and separation may be repeated several times in consideration of a cleaning degree. Preferably, a new hygroscopic paper is supplied in the processes that are repeated several times. Specifically, the processes of supplying of the hygroscopic paper to the support part, mutual contacting of the structure, separating of the structure, supplying of the new hygroscopic paper to the support part, mutual contacting of the structure, and separating of the structure are preferably repeated. FIG. 4 is a photograph showing a state in which cleaning is completely performed through the above-described repeated processes.

FIG. 5 is a photograph comparing cleaning results of structures performed by using a typical cleaning apparatus and method, and the cleaning apparatus and method of the present invention. In case that the structure is cleaned by the typical apparatus and method, it may be verified that the integrity of the structure is remarkably deteriorated. On the other hand, in case that the structure is cleaned by the cleaning apparatus and method of the present invention, it may be verified that mixture between two kinds of materials is not generated at all, and the integrity of the structure is excellent.

FIG. 6 is a photograph showing a process of performing the cleaning by using the cleaning apparatus and cleaning method of the present invention and the final structure obtained through the process. In FIG. 6, it may be verified that the preferred structure in which the mixture between two kinds of materials is not generated at all in the printing process is obtained with a high quality.

Also, the present invention provides a 3D printing apparatus that is characterized by including: a material supply part supplying a material of the 3D structure; a thickness control part controlling a thickness of the material supplied through the material supply part; a 3D printing module curing the material having the thickness controlled by the thickness control part into a preset shape; and a cleaning apparatus cleaning the 3D printing structure cured by the 3D printing module, wherein the cleaning apparatus includes: a hygroscopic paper supply part supplying a hygroscopic paper while a wound film-type hygroscopic paper is unwound; a hygroscopic paper collecting part winding and collecting the film-type hygroscopic paper; a film-type hygroscopic paper moving in a direction from the supply part to the collecting part between the supply part and the collecting part according to an mutual operation of the supply part and the collecting part; and a support part disposed on an opposite surface of a hygroscopic paper surface, on which the 3D printing structure is disposed, with respect to the film-type hygroscopic paper.

FIG. 7 is a bird's eye view illustrating an upper portion of a 3D printing apparatus 1000 according to an embodiment of the present invention.

Referring to FIG. 7, the 3D printing apparatus 1000 according to an embodiment of the present invention includes: a material supply part 1200 supplying a material of the 3D structure; a thickness control part 1300 controlling a thickness of the material supplied through the material supply part; a 3D printing module 1400 curing the material having the thickness controlled by the thickness control part into a preset shape; and a cleaning apparatus 1500 cleaning the 3D printing structure cured by the 3D printing module, wherein the cleaning apparatus includes: a hygroscopic paper supply part supplying a hygroscopic paper while the wound film-type hygroscopic paper is unwound; a hygroscopic paper collecting part winding and collecting the film-type hygroscopic paper; a film-type hygroscopic paper moving in a direction from the supply part to the collecting part between the supply part and the collecting part according to an mutual operation of the supply part and the collecting part; and a support part disposed on an opposite surface of a hygroscopic paper surface, on which the 3D printing structure is disposed, with respect to the film-type hygroscopic paper.

The 3D printing apparatus according to an embodiment of the present invention may be a lamination-type printing apparatus and have a method in which a single layer is laminated from a top layer to a bottom layer. That is, the 3D printing apparatus may be a printing apparatus adopting a top-down method in which one layer of a printing material is formed, and the other layer contacting a bottom surface of the one layer is laminated. The 3D printing apparatus may be applied to various fields such as a medical or engineering field according to an injected printing material and a multilayer 3D structure formed by being printed. Particularly, when printing using different kinds of materials is necessary in various fields, one layer may be formed of two kinds of materials.

Also, the 3D printing apparatus according to an embodiment of the present invention may include at least one of a material extrusion 3D printing apparatus, a vat photopolymerization 3D printing apparatus, a powder bed fusion 3D printing apparatus, a binder jetting 3D printing apparatus, a material jetting 3D printing apparatus, a sheet lamination 3D printing apparatus, and a directed energy deposition (DED) 3D printing apparatus in addition to the lamination-type printing apparatus.

The material supply part may supply at least one kind of single material. The material supplied to the material supply part may include metal, a metal alloy, ceramic, or an allotrope of elemental carbon. The allotrope of elemental carbon may include amorphous carbon, graphite, graphene, diamond, or fullerene.

The 3D printing apparatus according to an embodiment of the present invention may further include a material transfer part transferring the material supplied from the material supply part, may supply a material in a line method when transferring the material supplied from the material supply part by the material transfer part, and may include at least one roll member around which a line is wound, a motor driving the roll member, and a height adjusting member that adjusts a height of the roll member.

The material supply part may include at least one of a syringe type mounted with a mixing screw, an extrusion vessel type mounted with a mixing stirrer, and a slurry supply plate type applying a material on a surface.

The syringe type material supply part may include a cylinder accommodating a printing material therein; a mixing screw mounted in the cylinder; an extrusion syringe extruding the printing material on a line; and a hydraulic motor inducing a vertical movement of the extrusion syringe.

FIG. 8 is a side view illustrating the 3D printing apparatus according to an embodiment of the present invention. Referring to FIG. 8, the material transfer part 1100 may include a roll member 1110, a motor 1120, and a height adjusting member 1130.

The material transfer part may supply at least one film.

Also, in the embodiment, the material transfer part may include a plurality of lines. That is, the material transfer part may include two different lines and supply a film thereto as in FIG. 7. The material transfer part provided with different lines may induce the 3D printing module to move and continuously perform processes of curing-cleaning/drying-curing-cleaning/drying. Particularly, when a rotation-type 3D printing module is provided, the 3D printing module may repeatedly rotate to continuously perform each of the processes of curing-cleaning/drying-curing-cleaning/drying A user may change a rotation radius of a rotation-type 3D printing module by adding/subtracting the line of the material transfer part. Also, when a single material transfer part is provided, as a rotation angle of the 3D printing module decreases, the printing apparatus may have a reduced volume.

Also, the material transfer part may supply various kinds of films in a single line. Each of the material transfer parts may supply various kinds of films 8a, 8b, and 8c. The user may selectively supply the various kinds of films on the basis of a preset shape.

In the embodiment, the roll member may collect a used film while maintaining a wound line to be flat. Here, the height adjusting member may adjust a height of the collected film. At least one roll member may be provided, and when a plurality of roll members are provided, the roll members may have different radii.

The motor may drive the roll member.

In the embodiment, the motor may be directly or indirectly connected to the roll member to induce a rotation movement of the roll member. The motor may adjust a rotation speed of the roll member. The motor may be provided with the same number as the roll member, or a single motor may be connected to a single roll member to drive the roll member.

The height adjusting member may adjust a height of the roll member.

In the embodiment, the height adjusting member may adjust the height of the roll member so that one surface of the roll member contacts the collected film. The height adjusting member may adjust a height of each of the roll member or the motor according to a design shape of the material transfer part.

The 3D printing module may cure a 3D printing material, which is supplied by the material supply part or the material transfer part, into a preset shape to form the 3D printing structure.

The 3D printing module may be provided in a method having at least one of a rotational movement type, a horizontal movement type, and a vertical movement type, and all movement methods for sequentially curing a material according to provided types of the material supply part and the material transfer part. The rotation-type 3D printing module may rotate at a predetermined angle. The rotation-type 3D printing module is partially described as an embodiment in the following description. A feature except for the rotation movement of the rotation-type 3D printing module may be applied to the 3D printing module adopting a different movement method in the same manner.

The rotation-type 3D printing module may have a rotation angle varied according to the number of provided lines of the material transfer part. When the single material transfer part is provided, the rotation-type 3D printing module may have a rotation radius that is set at an angle formed between the material transfer part and the cleaning apparatus to rotate within the corresponding angle. Also, when the plurality of material transfer parts and the cleaning apparatus are provided, the rotation radius, the rotation, and the movement direction of the rotation-type 3D printing module may be set in various methods.

The rotation-type 3D printing module may horizontally rotate while a portion of a single layer, in which a first printing material is cured, is attached thereto, and cure the portion of the single layer by disposing the portion of the single layer, in which the first printing material is cured, at a position parallel to a film of a line, in which a second printing material is filled, thereby forming the single layer made of different constituents.

The rotation-type 3D printing module may form a portion of a single layer by curing the printing material disposed on one line of the material transfer part, and horizontally rotate while the portion of the single layer is attached to the other line of the material transfer part, to cure the portion of the single layer by allowing the printing material disposed on the other line of the material transfer part to contact the portion of the single layer on the same plane, thereby forming the single layer made of different constituents.

In the embodiment, the material supply part may fill a single film contained in a first line 1100*a*. The filled film may be cured by the 3D printing module. In the corresponding embodiment, the firstly filled printing material is defined as a first printing material A. A single layer, in which the first printing material A is cured, may be attached to the rotation-type 3D printing module and move to the other line 1100*b* through a horizontal rotation. The cured first printing material A may be impregnated into a film filled with a second printing material B at the other line 1100*b*. The first and second printing materials may be distinguished for a sequence, and made of the same material or different materials. The 3D printing module may cure the second printing material B impregnated with the first printing material A. Through this, the rotation-type 3D printing module may form a single layer made of different materials and contacting on the same plane.

The 3D printing module may form a single layer by curing the printing material disposed on one line of the material transfer part, and move in a single layer attached state to the other line of the material transfer part and cure the printing material on the other line of the material transfer part in a state in which the printing material of the other line of the material transfer part contacts the single layer on different planes, thereby forming the single layer made of a single constituent.

Referring to FIG. 8, the 3D printing module 1400 may include: light emitting unit 1410; a substrate 1420 on which a line, to which the printing material is supplied, is seated; a build plate 1430 to which the printing material disposed on the line is attached; a printing chamber 1440 storing the light emitting unit, the substrate, and the build plate and moving in a direction parallel to the material transfer part; and a vacuum pump 1450 removing air of the printing chamber.

The light emitting unit 1410 may supply an energy source including at least one of a laser, an infrared ray (IR), an electromagnetic beam, a laser beam, an electronic beam, a plasma beam, or a microwave beam.

For example, the light emitting unit 1410 may be disposed below the 3D printing module to emit light in an upward direction. The light emitting unit may simultaneously move with the 3D printing module. The light emitting unit may emit light to the substrate. The light emitted from the light emitting unit may be transmitted through the substrate and emitted to the film. The light emitting unit may emit various kinds of light that is necessary for curing the printing material. The light emitted from the light emitting unit may be emitted by being refracted or scattered according to a size and shape of the film. The light emitting unit may have a set condition such as a wavelength and an intensity to emit light.

The substrate 1420 may be made of a transparent material to transmit the light emitted from the light emitting unit, and vertically driven to adjust a height of the printing material seated on a top surface of the substrate.

The printing chamber 1440 may store the light emitting unit, the substrate, and the build plate therein, and move in parallel to the material transfer part.

In the embodiment, the printing chamber may be a container for storing the light emitting unit, the substrate, and the build plate. The printing chamber may move according to a progressing printing process. The printing chamber may maintain an inner vacuum state for improving a quality of the structure or require an additional component for reducing a pressure.

The vacuum pump 1450 may remove gases in the printing chamber.

In the embodiment, the vacuum pump may be provided inside the printing chamber or connected from the outside of the printing chamber. The vacuum pump may be a component formed by being printed to improve the quality of the 3D structure. Particularly, the vacuum pump may provide an optimized condition for attaching the film and the printing material to the substrate disposed in the printing chamber.

An embodiment of the present invention includes all features related to the present invention among features disclosed in Korean Patent Application No. 10-2017-0092991.

For example, the 3D printing apparatus according to an embodiment of the present invention may include: a material transfer part including at least two lines; a material supply part supplying one kind of printing material to each of the lines of the material transfer part; a thickness control part controlling a thickness of the material supplied through the material supply part; and a 3D printing module curing the material having a thickness controlled through the thickness control part into a preset shape and moving to the other line, after curing the material on one line, to cure the material on the other line.

Also, for example, the 3D printing apparatus according to an embodiment of the present invention may adopt a top-down method in which one layer of the printing material is formed, and the other layer contacting a bottom surface of the one layer is laminated thereon.

Also, for example, the 3D printing apparatus according to an embodiment of the present invention may include the material transfer part including: at least one roll member around which the line is wound; a motor driving the roll member; and a height adjusting member that adjusts a height of the roll member.

Also, for example, the 3D printing apparatus according to an embodiment of the present invention may include the printing module forming a portion of a single layer by curing the printing material on one line of the material transfer part, and moving to the other line of the material transfer part in a state in which a portion of the single layer is attached and curing the printing material on the other line of the material transfer part while the printing material on the other line of the material transfer part contacts the portion of the single layer on the same plane, thereby forming the single layer made of different constituents.

Also, for example, the 3D printing apparatus according to an embodiment of the present invention may include the 3D printing module forming a single layer by curing the printing material on one line of the material transfer part, and moving to the other line of the material transfer part in a state in which the single layer is attached and curing the printing material on the other line of the material transfer part while the printing material on the other line of the material transfer part contacts the single layer on different planes, thereby forming the single layer made of a single constituent.

A 3D printing apparatus according to another embodiment of the present invention may include a first cleaning apparatus and a first drying module or include a first cleaning apparatus, a second cleaning apparatus, and a first drying module. However, the embodiment of the present invention is not limited to the particular number of each of the cleaning apparatus and the drying module according to an environment in which the 3D printing apparatus according to another embodiment of the present invention is used. For example, the various number of each of the cleaning apparatus and the drying module may be provided.

The cleaning apparatus of the 3D printing apparatus according to the present invention includes: a hygroscopic paper supply part supplying a wound film-type hygroscopic paper while being unwound; a hygroscopic paper collecting part winding and collecting the film-type hygroscopic paper; a film-type hygroscopic paper moving in a direction from the supply part to the collecting part between the supply part and the collecting part according to a mutual operation of the supply part and the collecting part; and a support part disposed on an opposite surface of a hygroscopic paper surface, on which the 3D printing structure is disposed, with respect to the film-type hygroscopic paper.

The specific components of the cleaning apparatus of the present invention are described as stated above.

The 3D printing apparatus according to an embodiment of the present invention may further include a collecting module 600, and the collecting module 600 may be provided to collect the printing material that is not used in the rotation-type 3D printing module. The collecting module 600 may separate and collect the printing material that is supplied to the material transfer part and not used, and re-supply the collected printing material 24 to the material supply part. As described above, the 3D printing apparatus according to an embodiment of the present invention may repeatedly use the initially injected printing material. Through this, the 3D printing apparatus may improve a usage efficiency of the printing material.

Also, the 3D printing apparatus may further include a transfer unit for transferring at least one of the material supply part, the material transfer part, the thickness control part, the 3D printing module, and the cleaning apparatus. The transfer unit may be operationally connected to the material supply part, the material transfer part, the thickness control part, the 3D printing module, and the cleaning apparatus, and move each of the material supply part, the material transfer part, the thickness control part, the 3D printing module, and the cleaning apparatus to a predetermined position and control the position. However, the embodiment of the present invention is not particularly limited to the transfer unit. For example, the transfer unit may be a manipulator controlling a position in a linear or streamlined manner.

Also, the present invention provides a 3D printing apparatus including: a material supply part supplying a material of a 3D printing structure; a thickness control part controlling a thickness of the material supplied through the material supply part; a 3D printing module curing the material having a thickness controlled through the thickness control part into a preset shape; and a cleaning apparatus that cleans the cured 3D printing structure by the 3D printing module, wherein the cleaning apparatus includes: a cleaning fluid supply part supplying a cleaning fluid; a discharge part discharging the cleaning fluid; and a cleaning chamber in which the cleaning is performed.

Other components of the 3D printing apparatus except for the cleaning apparatus are the same as those stated above.

FIG. 9 is a perspective view illustrating the cleaning apparatus of the 3D printing apparatus according to an embodiment of the present invention.

FIG. 10 is a side view illustrating the cleaning apparatus of the 3D printing apparatus according to an embodiment of the present invention.

Referring to FIGS. 9 and 10, the cleaning apparatus 1500 may include: a cleaning fluid supply part 1520 supplying a cleaning fluid; a cleaning fluid discharge part 1530 discharging the cleaning fluid that is previously used for the cleaning of the structure; and a cleaning chamber 1510 in which the cleaning of the structure is performed. Also, the cleaning fluid supply part may be disposed on each of one side surface of the cleaning chamber and a different side surface opposite to the one side surface to clean a side surface of the 3D printing structure. Also, the cleaning fluid supply part may have a shape such as a nozzle capable of adjusting a cleaning direction.

The cleaning fluid supply part may include a cleaning fluid controller 1523, a cleaning fluid supply line 1522, and a cleaning nozzle 1521. The cleaning fluid supply part may supply a cleaning fluid in a liquid state or a gas state. When the cleaning fluid is a liquid, the cleaning fluid may be at least one of water, an organic solvent, and a mixed solvent. The cleaning fluid may include any fluid as long as the fluid does not corrode or damage the 3D printing structure according to the used material of the 3D printing structure. The cleaning fluid discharge part 1530 may include a cleaning fluid controller 1532 and a cleaning fluid discharge line 1531. The cleaning fluid discharge part 1530 may discharge a cleaning fluid in a liquid state or a gas state.

Also, the cleaning fluid controller may further include a heating and cooling unit capable of heating and cooling the cleaning fluid at a predetermined temperature.

FIG. 11 is an enlarge view illustrating the cleaning nozzle of the cleaning fluid supply part.

Referring to FIG. 11, the cleaning nozzle 1521 of the cleaning fluid supply part may be fluidically connected to the cleaning fluid controller and include at least one first injection hole having a predetermined injection diameter and at least one second injection hole having an injection diameter less than that of the first injection hole.

The cleaning nozzle may be a micro spraying nozzle. The cleaning nozzle may finely spray a fluid to perform a cleaning without a physical damage of the 3D printing structure.

The cleaning fluid supply part may supply the cleaning fluid at a pressure of about 100 mbar to about 10 bar. With the pressure of the cleaning fluid, the uncured 3D printing material of the 3D printing structure may be cleaned, and when the 3D printing structure is not formed in a laminated manner, undesired mixture between two kinds of materials may be prevented.

The cleaning fluid discharge part may discharge the cleaning fluid that is previously used for the cleaning of the 3D printing structure, and be connected to a suction unit such as a vacuum pump capable of applying a negative pressure to discharge the cleaning fluid.

The cleaning chamber may further include a cleaning chamber cover separating an inner space of the cleaning chamber, in which the cleaning of the 3D printing structure is performed, from an outer space of the cleaning chamber. The cleaning chamber cover may prevent a malfunction of the apparatus from being generated as the cleaning fluid is introduced into the 3D printing apparatus, and fluidically separate the cleaning chamber from the 3D printing apparatus.

The 3D printing apparatus according to an embodiment of the present invention may further include a drying module disposed adjacent to one side of the cleaning apparatus to dry the 3D printing structure. The drying module may include a dry fluid supply part supplying a dry fluid, a dry fluid discharge part discharging the dry fluid, and a dry chamber in which drying is performed.

The dry fluid supply part may include a dry fluid controller, a dry fluid supply line, and a drying nozzle. The dry fluid controller may further include a heating and cooling unit capable of heating and cooling the dry fluid at a predetermined temperature. The dry fluid may include any gas as long as the gas does not damage the 3D printing structure.

In the embodiment, the cleaning apparatus may clean or dry the printing material cured in the rotation-type 3D printing module. As the cleaning apparatus is provided, a required time, in which a single layer contacts another single layer, may decrease. The cleaning apparatus may be provided in singularity or plurality as necessary. When two kinds of materials are provided to the supply lines through the cleaning apparatus, mixture between the materials may be prevented.

When the 3D printing structure is formed by using the two kinds of 3D printing materials in the previously described process, the first printing material may move to the cleaning apparatus, after being cured, and be cleaned and dried, and the corresponding process may be a process for preventing the first printing material and the second printing material from being mixed in a process of forming the same single layer. Also, as the uncured material of the first printing material is cleaned through the corresponding process, an area for curing the second printing material may be provided, and, through this, a single layer including different materials may be formed according to preset characteristics.

FIG. 12 is a perspective view illustrating another cleaning apparatus of the 3D printing apparatus according to an embodiment of the present invention.

FIG. 13 is a side view illustrating the another cleaning apparatus of the 3D printing apparatus according to an embodiment of the present invention.

Referring to FIGS. 12 and 13, the 3D printing apparatus according to an embodiment of the present invention may further include a dry fluid supply part 1540 disposed in the cleaning chamber, and thus cleaning and drying may be simultaneously performed in one chamber by using this. The dry fluid supply part may include a dry fluid controller 1543, a dry fluid supply line 1542, and a drying nozzle 1541. The drying fluid discharge part may include a drying fluid controller 1532 and a drying fluid discharge line 1531.

Also, the dry fluid controller may further include a heating and cooling unit capable of heating and cooling the dry fluid at a predetermined temperature.

Also, the 3D printing apparatus according to an embodiment of the present invention may include a drying module disposed at one side of the cleaning apparatus and including a dry fluid supply part, a dry fluid discharge part, and a drying chamber. Through this, the 3D printing apparatus capable of performing cleaning and drying at separated spaces may be provided.

FIG. 14 is a perspective view illustrating another cleaning apparatus of the 3D printing apparatus according to an embodiment of the present invention.

Referring to FIG. 14, the another cleaning apparatus of the 3D printing apparatus according to an embodiment of the present invention may further include a cleaning nozzle driving module that moves a cleaning nozzle in a first direction or a second direction. Also, the another cleaning apparatus of the 3D printing apparatus according to an embodiment of the present invention may further include a drying nozzle driving module that moves a drying nozzle in the first direction or the second direction. Through this, the 3D structure may be effectively cleaned and dried by supplying a cleaning fluid and a drying fluid appropriately to the shape of the 3D structure.

FIG. 15 is a flowchart representing a 3D printing method according to an embodiment of the present invention.

Referring to FIG. 15, the 3D printing method according to an embodiment of the present invention includes: a process of supplying at least one material; a process of outputting the supplied material into a 3D structure; and a process of cleaning the outputted 3D structure. Here, the process of cleaning the outputted 3D structure may be performed by using a cleaning fluid in at least one of an immersion method, a spray method, and an injection method.

Firstly, the process of supplying at least one material will be described.

The process may supply at least one single material. The material supplied to the material supply part may include element metal, a metal alloy, ceramic, or an allotrope of element carbon. The allotrope of the element carbon may include amorphous carbon, graphite, graphene, diamond, or fullerene.

The process of supplying at least one material may supply at least one-type of material among various types of materials to the material transfer part of the 3D printing apparatus through the material supply part including at least one kind of 3D printing material. Also, the supplied material may have a preset thickness that is adjusted by using a roll member or a leveling member.

Also, the 3D printing method according to an embodiment of the present invention may further include a process of transferring the supplied material after the process of supplying at least one material is performed.

Next, the process of outputting the supplied material into the 3D structure will be described.

In the process of outputting the supplied material into the 3D structure, the printing material having a thickness adjusted in the previous process may be disposed on the substrate of the 3D printing module and then cured, and the printing material having the adjusted thickness may contact and be attached to a bottom surface of the build plate of the 3D printing module. In the process of outputting the supplied material into the 3D structure, the 3D printing material supplied to the 3D printing module may be disposed on the build plate and then irradiated with an energy source, thereby being cured.

When the 3D printing structure has a multilayered structure, the process of supply the material may be performed by repeatedly performing the process of supplying at least one material and the process of outputting the supplied material into the 3D structure.

Next, the process of cleaning the outputted 3D structure will be described.

After the 3D structure is formed into a predetermined shape in the previous process, the 3D printing module may move to the cleaning apparatus as necessary. The 3D printing module may cure at least a partial area of the printing material filled into a film, and, through this, a single layer made of different kinds of constituents may be formed. Also, the 3D printing module may cure the entire printing material filled into the film, and, through this, a single layer made of a single kind of constituent may be formed.

The process of cleaning the outputted 3D structure may be performed using a cleaning fluid by at least one of an immersion method, a spray method, and an injection method. Also, the cleaning fluid may include at least one of water, an organic solvent, and a mixed solvent The 3D printing method may further include a process of drying the 3D structure after the process of cleaning the outputted 3D structure is performed. The process of drying the 3D structure may be performed by a dry fluid that is cooled or heated at a predetermined temperature.

FIG. 16 is a view representing a cleaning effect according to a cleaning condition and a cleaning solvent of the 3D structure.

Referring to FIG. 16, a primary cleaning is performed by using a brush having a bristle having a predetermined micro-size, and then a secondary cleaning is performed by using ethanol, a mixed solvent of ethanol and water (70:30), IPA, and acetone as a solvent. It is verified that a damage or an uneven portion is generated on a surface because unreacted slurry and a green body, which is not completely cured, are cleaned together due to usage of the brush. Also, it is verified that the cleaning is performed while maintaining a smooth surface without a defect when the IPA, which has a highest viscosity, is used as a cleaning solvent among the ethanol, the mixed solvent of ethanol and water (70:30), the IPA, and the acetone.

FIG. 17 is a view representing a cleaning effect according to an ultrasonic cleaning condition and a cleaning solvent of the 3D structure. The cleaning effect is evaluated such that the IPA is sufficiently filled in an ultrasonic cleaner of FIG. 17 so that the 3D structure is immersed, and then while an ultrasonic condition is varied, an amplitude and a time are controlled because a force applied to the 3D structure is varied according to an intensity and a time of an ultrasonic wave.

Referring to FIG. 17, although it is verified that the cleaning is appropriately performed without affecting the 3D structure under a condition having a high amplitude and a short time, it is also verified that the ultrasonic cleaning affects a delamination phenomenon between layers of the 3D structure and a surface roughness even under an optimized condition. Through this, it is verified that the ultrasonic cleaning is not preferred for cleaning of the 3D structure.

FIG. 18 is a view representing a cleaning effect according to a spray cleaning condition and a cleaning solvent of the 3D structure. In FIG. 18, cleaning is performed by using a spray device capable of micro-spraying a cleaning solvent in a mist-type in order to minimize a physical force applied to the 3D structure, and the cleaning solvent includes IPA, ethanol, a mixed solution of IPA and water, and a mixed solution of PGEMA and IPA (50:50).

Referring to FIG. 18, it may be verified that an effect to the 3D structure is minimized when the IPA is used as a cleaning solvent even under a micro-spraying condition using the spray device.

FIG. 19 is a view representing a cleaning effect before and after a cleaning of the 3D structure by using the cleaning apparatus. In FIG. 19, the cleaning of the 3D structure is performed by using the above-described cleaning nozzle capable of spraying in FIG. 11.

Referring to FIG. 19, it is verified that only unreacted slurry is clearly removed from the surface of the 3D structure, and the uncured green body is not removed.

FIG. 20 is a view representing a mapping for element analysis and EDX results, which are obtained by comparing a feature of performing the stamping cleaning (on the right side) and a feature of not performing the stamping cleaning (on the left side) with the method of the present invention in the process of performing 3D printing by using two kinds of materials. Through FIG. 20, it may be verified that a residual mixed material is restricted less than about 1% when the stamping cleaning is performed with the method of the present invention.

According to the present invention, the 3D printing structure may be cleaned without using a solvent or by using a minimum amount of solvent, and the quality and integrity of the 3D printing structure may be remarkably enhanced by preventing the mixture between materials.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A 3-dimensional (3D) printing apparatus for manufacturing a 3-dimensional (3D) printing structure, the 3D printing apparatus comprising:
   a material supply part configured to supply a material of the 3D printing structure;
   a thickness control part configured to control a thickness of the material supplied through the material supply part;
   a 3D printing module configured to cure the material having the thickness controlled by the thickness control part into a shape; and
   a cleaning apparatus configured to clean the 3D printing structure, the cleaning apparatus including, a hygroscopic paper supply part configured to supply a film-type hygroscopic paper, a hygroscopic paper collecting part configured to wind and collect the film-type hygroscopic paper, the hygroscopic paper supply part and the hygroscopic paper collecting part configured to rotate at a same rotation speed and in a same rotation direction to move the film-type hygroscopic paper in a direction from the hygroscopic paper supply part to the hygroscopic paper collecting part between the hygroscopic paper supply part and the hygroscopic paper collecting part, a support part having a predetermined area configured to support a first surface of the hygroscopic paper on the predetermined area, the support part being made of a material having cushioning characteristics and being capable of adsorbing pressure applied to the 3D printing structure to remove a residual material on the 3D printing structure without affecting integrity of the 3D printing structure, the first surface of the film-type hygroscopic paper being opposite to a second surface of the film-type hygroscopic paper, the second surface being in contact with the 3D printing structure, a stage configured to affix the 3D printing structure beneath the stage, the stage configured to descend the 3D printing structure affixed thereto to mutually contact the film-type hygroscopic paper on the support part and ascend to separate the 3D printing structure affixed thereto from the film-type hygroscopic paper, and a solvent supply part configured to control at least one of a spray direction, a spray method or spray amount of a solvent, wherein the cleaning apparatus is configured to clean the 3D printing structure by contacting the film-type hygroscopic paper with the 3D printing structure and separating the 3D printing structure from the film-type hygroscopic paper to remove uncured portion from the 3D printing structure, wherein the hygroscopic paper supply part and the hygroscopic paper collecting part are configured to stop a movement in the direction from the hygroscopic paper supply part to the hygroscopic paper collecting part while the film-type hygroscopic paper is in contact with the 3D printing structure, and wherein the solvent supply part is disposed after the hygroscopic paper supply part and before the support part.

2. The 3D printing apparatus of claim 1, wherein the solvent supply part is configured to supply a solvent to the film-type hygroscopic paper supplied from the hygroscopic paper supply part.

3. The 3D printing apparatus of claim 2, wherein the solvent supply part is spaced apart from the film-type hygroscopic paper and is configured to spray the solvent onto the film-type hygroscopic paper.

4. The 3D printing apparatus of claim 3, wherein the solvent supply part is configured to spray the solvent onto a portion of the film-type hygroscopic paper before the portion of the film-type hygroscopic paper contacts the 3D printing structure affixed to the stage.

5. The 3D printing apparatus of claim 1, wherein the support part has an area equal to or greater than that of the 3D printing structure that contacts the support part with the film-type hygroscopic paper therebetween.

6. The 3D printing apparatus of claim 1, wherein the 3D printing apparatus includes a plurality of material supply parts that are configured to provide different materials, and the cleaning apparatus is between the material supply parts.

7. The 3D printing apparatus of claim 1, wherein the solvent supply part is under the film-type hygroscopic paper supplied from the hygroscopic paper supply part such that the solvent supply part and the stage are opposite to each other with respect to the film-type hygroscopic paper supplied from the hygroscopic paper supply part.

8. The 3D printing apparatus of claim 1, further comprising:

a first line including the material supply part and the thickness control part, and a second line including another material supply part and another thickness control part, wherein the 3D printing module is configured to rotate between the first line and the second line.

9. A cleaning method for manufacturing a 3D printing structure using the 3D printing cleaning apparatus according to claim 1, comprising:

supplying at least one material;

outputting the supplied material into a 3D printing structure;

supplying the film-type hygroscopic paper;

disposing the supplied film-type hygroscopic paper on the support part;

allowing the 3D printing structure to contact the film-type hygroscopic paper on the support part;

separating the 3D printing structure from the film-type hygroscopic paper; and collecting the film-type hygroscopic paper.

10. The method of claim 9, wherein processes from the supplying of the film-type hygroscopic paper to the collecting of the film-type hygroscopic paper are repeatedly performed.

11. The method of claim 9, further comprising:

applying the solvent to the film-type hygroscopic paper supplied from the hygroscopic paper supply part at least one time.

12. The method of claim 9, wherein an uncured portion of the material of the 3D printing structure is removed through the allowing the 3D printing structure to contact the film-type hygroscopic paper.

13. The method of claim 11, wherein processes from the supplying of the film-type hygroscopic paper to the collecting of the film-type hygroscopic paper are repeated at least five times.

* * * * *